(12) United States Patent
Ueno et al.

(10) Patent No.: US 8,294,996 B2
(45) Date of Patent: Oct. 23, 2012

(54) DIFFRACTIVE OPTICAL ELEMENT AND METHOD OF MANUFACTURING THE SAME

(75) Inventors: Tomoyuki Ueno, Itami (JP); Masato Hasegawa, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 350 days.

(21) Appl. No.: 12/740,094

(22) PCT Filed: Oct. 31, 2008

(86) PCT No.: PCT/JP2008/069931
§ 371 (c)(1),
(2), (4) Date: Apr. 27, 2010

(87) PCT Pub. No.: WO2009/057772
PCT Pub. Date: May 7, 2009

(65) Prior Publication Data
US 2010/0254006 A1    Oct. 7, 2010

(30) Foreign Application Priority Data
Nov. 2, 2007   (JP) .................................. 2007-285729

(51) Int. Cl.
G02B 27/44    (2006.01)
G02B 3/08    (2006.01)
G02B 1/00    (2006.01)
B29D 11/00    (2006.01)

(52) U.S. Cl. ......................... 359/742; 359/565; 264/1.21
(58) Field of Classification Search .......... 359/565–576, 359/742–743; 264/1.1–2.7
See application file for complete search history.

(56) References Cited

U.S. PATENT DOCUMENTS
2002/0027301 A1* 3/2002 Kato et al. ..................... 264/1.7
2004/0212107 A1   10/2004 Hasegawa
2007/0003876 A1    1/2007 Schilling et al.

FOREIGN PATENT DOCUMENTS
| JP | 10-138004 A | 5/1998 |
| JP | 10-221516 A | 8/1998 |
| JP | 11-197902 A | 7/1999 |
| JP | 11-263627 A | 9/1999 |
| JP | 2001-322130 A | 11/2001 |

(Continued)

OTHER PUBLICATIONS

Y. Guimond et al., "Comparison of performances between GASIR molded optics and existing IR optics", Defence and Security Symposium, proc. SPIE, vol. 5406, pp. 114-120, 2004.

(Continued)

*Primary Examiner* — Alessandro Amari
*Assistant Examiner* — Kimberly N Kakalec
(74) *Attorney, Agent, or Firm* — Global IP Counselors, LLP

(57) ABSTRACT

A diffractive optical element (1) composed of a ceramic, in which the optical characteristics are enhanced by enhancing the machining precision, is composed of an infrared-transmissive ceramic, and prominent portions (11) and groove portions (12) are repeatedly formed on a surface of the diffractive optical element (1). The average value of the surface roughness Ra within an optical effective area (10) of the surface of the diffractive optical element is 0.05 µm or less, and the difference in the surface roughness Ra within the optical effective area (10) of the surface is 0.02 µm or less.

13 Claims, 14 Drawing Sheets

FOREIGN PATENT DOCUMENTS

| | | |
|---|---|---|
| JP | 2002-321146 A | 11/2002 |
| JP | 2003-075622 A | 3/2003 |
| JP | 2005-111839 A | 4/2005 |
| JP | 2006-520923 A | 9/2006 |
| JP | 2006-323915 A | 11/2006 |
| JP | 2007-233002 A | 9/2007 |
| WO | WO-03/055826 A1 | 7/2003 |

OTHER PUBLICATIONS

J. Yan, et al., "Micro grooving on single-crystal germanium for infrared Fresnel lenses", Journal of Micromechanics and Microengineering, pp. 1925-1931, 2005.

Japanese Office Action of the corresponding Japanese Application No. 2007-285729, dated Jun. 19, 2012.

* cited by examiner

DIFFRACTIVE OPTICAL ELEMENT AND METHOD OF MANUFACTURING THE SAME

TECHNICAL FIELD

The present invention relates to a diffractive optical element and to a method for manufacturing the same, and more specifically relates to a diffractive optical element having excellent optical characteristics, and to a method for manufacturing the same.

BACKGROUND ART

Diffractive optical elements (DOE) for focusing light and performing other functions by utilizing a light diffraction phenomenon to change the direction in which light is propagated have drawn attention in recent years. In a diffractive optical element, prominent portions and groove portions are repeatedly formed on the surface, and the machining precision thereof has a significant effect on the optical characteristics of the element. For this reason, numerous studies have been conducted relating to methods for machining a diffractive optical element, and various machining methods have been proposed (see, for example, Japanese Laid-open Patent Publication No. 11-197902, Japanese Laid-open Patent Publication No. 10-138004, and International Patent Publication Pamphlet No. 2003/055826).

DISCLOSURE OF THE INVENTION

Problems which the Invention is Intended to Solve

However, in the machining methods disclosed in Patent Documents 1 and 2 in which a cutting tool is used, the cutting tool becomes progressively more abraded when the diffractive optical element is composed of a hard material, e.g., ceramic, and the optical characteristics of the diffractive optical element are therefore adversely affected. When the cutting tool is abraded over a short period of time, the cutting tool must be frequently replaced, production efficiency is reduced, and manufacturing cost increases. To address these problems, such measures as using a diamond tool as the cutting tool are disclosed in Patent Documents 1 and 2. However, although these measures suppress the progress of abrasion of the cutting tool to a certain degree, the improvement to machining precision is not necessarily adequate. The use of a diamond tool also has the drawback of increased manufacturing cost.

According to the method disclosed in Patent Document 3 for manufacturing an optical component composed of a ceramic, since the ceramic optical component is sintered and compression molded, the abovementioned problem of abrasion of the cutting tool is significantly reduced. However, adequate machining precision is not necessarily obtained merely through the use of sintering and compression molding in the process of manufacturing a ceramic diffractive optical element, and the optical characteristics of the element are not adequately enhanced.

Therefore, an object of the present invention is to provide a ceramic diffractive optical element in which the optical characteristics thereof are enhanced by enhancing the machining precision, and to provide a method for manufacturing a diffractive optical element whereby a ceramic diffractive optical element having enhanced optical characteristics can be manufactured by enhancing the machining precision, while the manufacturing cost is kept low.

Means Used to Solve the Above-Mentioned Problems

The diffractive optical element according to the present invention is a diffractive optical element comprising an infrared-transmissive ceramic, prominent portions and groove portions being repeatedly formed on a surface of the diffractive optical element. The average value of the surface roughness Ra within an optical effective area of the surface of the diffractive optical element is 0.05 μm or less, and the difference in the surface roughness Ra within the optical effective area of the surface is 0.02 μm or less.

The inventors conducted a detailed investigation of the relationship between the optical characteristics and the machining precision of a diffractive optical element composed of an infrared-transmissive ceramic. As a result, the inventors discovered that the surface roughness and fluctuation of the surface roughness among regions of a diffractive optical element have a significant effect on the optical characteristics of the diffractive optical element. The inventors also learned that the optical characteristics of a diffractive optical element can be markedly enhanced by adopting a configuration in which the average value of the surface roughness Ra within an optical effective area of the surface of the diffractive optical element is 0.05 μm or less, and the difference in the surface roughness Ra within the optical effective area of the surface is 0.02 μm or less. Consequently, according to the diffractive optical element of the present invention, a diffractive optical element can be provided that has markedly enhanced optical characteristics.

The term "optical effective area" refers to the area of the surface of the optical element in which light can enter and/or exit when the optical element is in use. The abovementioned average value of the surface roughness Ra can be found by measuring the surface roughness of any five locations within the optical effective area, for example, and computing the average of the measurements. The abovementioned difference in the surface roughness Ra can be found by measuring the surface roughness of any five locations within the optical effective area, for example, and computing the difference between the maximum value and the minimum value.

In the diffractive optical element, the diffractive optical element is preferably a sintered body of a powder comprising a ceramic. A tip of the prominent portion in a section that includes the optical axis of the diffractive optical element has a radius of curvature larger than one-half the average grain size of the powder.

When the diffractive optical element is a sintered body of a powder composed of a ceramic, the machining precision of the tips of the prominent portions is affected by the grain size of the powder. The machining precision of the tips of the prominent portions is enhanced, and the optical characteristics of the diffractive optical element are enhanced by adopting a configuration in which the tips of the prominent portions have a radius of curvature larger than one-half the average grain size of the powder.

In the diffractive optical element, a bottom of the groove portion in a section that includes the optical axis of the diffractive optical element preferably has a radius of curvature larger than one-half the average grain size of the powder.

In the diffractive optical element, the diffractive optical element is preferably a sintered body of a powder comprising a ceramic. A bottom of the groove portion in a section that includes the optical axis of the diffractive optical element has a radius of curvature larger than one-half the average grain size of the powder.

When the diffractive optical element is a sintered body of a powder composed of a ceramic, the machining precision of the bottoms of the groove portions is affected by the grain size of the powder, the same as in the case of the tips of the prominent portions. The machining precision of the bottoms of the groove portions is enhanced, and the optical characteristics of the diffractive optical element are enhanced by adopting a configuration in which the bottoms of the groove portions have a radius of curvature larger than one-half the average grain size of the powder.

In the diffractive optical element, a surface on a far side of the optical axis at the bottom of the groove portion in a section that includes the optical axis of the diffractive optical element preferably tilts further away from the optical axis as the distance from the bottom increases, and the surface and a straight line parallel to the optical axis form an angle 7° or larger and 75° or smaller.

Release (demolding) from the die when confinement by the die is released is thereby facilitated when the prominent portions and the groove portions are molded by confinement in a die in the process for manufacturing the diffractive optical element.

The diffractive optical element composed of a ceramic may include a ceramic as the main component thereof and include residual impurities, or may be composed of a ceramic as the main component, a sintering aid and other additives, and residual impurities.

The method for manufacturing a diffractive optical element according to the present invention is a method for manufacturing a diffractive optical element comprising an infrared-transmissive ceramic, prominent portions and groove portions being repeatedly formed on a surface of the diffractive optical element. This method for manufacturing a diffractive optical element comprises a step in which a molded body is fabricated by molding a starting material powder comprising a ceramic; a step in which the molded body is heat treated and a sintered precursor is fabricated; and a step in which the sintered precursor is deformed by being compressed and heated while confined by a die, and a compressed sintered body is fabricated. The die comprises a part for forming prominent portions, wherein the part is used to form the prominent portions; and a part for forming groove portions, wherein the part is used for forming the groove portions. A bottom of the part for forming prominent portions of the die in a section that includes the optical axis of the sintered precursor confined in the die in the step in which the compressed sintered body is fabricated has a radius of curvature larger than one-half the average grain size of the starting material powder.

In the method for manufacturing a diffractive optical element according to the present invention, the prominent portions and groove portions of the diffractive optical element are molded by a die. The bottom of the part for forming a prominent portion in the die has a radius of curvature larger than one-half the average grain size of the starting material powder. Therefore, when the sintered precursor is confined by the die and deformed, the ability of the sintered precursor to conform to the die is enhanced, and the machining precision is enhanced. Chipping of the tips of the prominent portions when the fabricated compressed sintered body is separated from the die is also reduced, and the machining precision of the diffractive optical element is therefore enhanced, contamination of or damage to the die is reduced, the durability of the die is enhanced, and the manufacturing cost is kept low. Through the method for manufacturing a diffractive optical element according to the present invention as described above, the machining precision is enhanced while the manufacturing cost is kept low, and a ceramic diffractive optical element that has enhanced optical characteristics can thereby be manufactured.

In the method for manufacturing a diffractive optical element according to the present invention, cemented carbide or cemented carbide coated with diamond-like carbon (DLC), chromium nitride (CrN), or the like; silicon carbide (SiC) or silicon carbide coated with CVD (Chemical Vapor Deposition)—SiC or the like; graphite; boron carbide ($B_4C$); silicon nitride ($Si_3N_4$); cubic boron nitride (cBN); glassy carbon; and other materials having excellent strength at high temperature can be used as the die material.

In the method for manufacturing a diffractive optical element, a tip of the part for forming a groove portion of the die in the section preferably has a radius of curvature larger than one-half the average grain size of the starting material powder.

The method for manufacturing a diffractive optical element according to the present invention is a method for manufacturing a diffractive optical element comprising an infrared-transmissive ceramic, prominent portions and groove portions being repeatedly formed on a surface of the diffractive optical element. The method for manufacturing a diffractive optical element comprises a step in which a molded body is fabricated by molding a starting material powder comprising the ceramic; a step in which the molded body is heat treated and a sintered precursor is fabricated; and a step in which the sintered precursor is deformed by being compressed and heated while confined by a die, and a compressed sintered body is fabricated. The die comprises a part for forming a prominent portion, wherein the part is used to form the prominent portions; and a part for forming a groove portion, wherein the part is used to form the groove portions. A tip of the part for forming a groove portion of the die in a section that includes the optical axis of the sintered precursor confined in the die in the step in which the compressed sintered body is fabricated has a radius of curvature larger than one-half the average grain size of the starting material powder.

In a case in which the prominent portions and groove portions of the diffractive optical element are molded by a die, the tip of the part for forming a groove portion in the die has a radius of curvature larger than one-half the average grain size of the starting material powder, and the ability of the sintered precursor to conform to the die is thereby enhanced, and the machining precision is enhanced, the same as in the case of the part for forming a prominent portion described above. Furthermore, less stress is concentrated at the tip of the part for forming a groove portion when the die is in contact with the sintered precursor, and damage to the die at the tip of the part for forming a groove portion is suppressed. The machining precision of the diffractive optical element is therefore enhanced, the durability of the die is enhanced, and the manufacturing cost is kept low.

In the method for manufacturing a diffractive optical element, a surface on a far side of the optical axis at the tip of the part for forming a groove portion in the section preferably tilts further away from the optical axis as the distance from the tip increases, and the surface and a straight line parallel to the optical axis form an angle 7° or larger and 75° or smaller.

Releasing (demolding) of the compression-molded body from the die is thereby facilitated. Demolding is not adequately facilitated when the angle formed by the surface on the far side from the optical axis and the straight line parallel to the optical axis is less than 7°, and since the optical characteristics of the diffractive optical element are adversely affected when this angle exceeds 75°, the angle is preferably 7° or larger and 75° or smaller.

In the method for manufacturing a diffractive optical element, the die is preferably ground using a grindstone or an abrasive.

The surface roughness of the die significantly affects the surface roughness of the manufactured diffractive optical element. As described above, the surface roughness of the die, particularly the surface roughness of the area of the die for molding the optical effective area of the diffractive optical element, is reduced by grinding the die, particularly the area of the die for molding the optical effective area of the diffractive optical element, using a grindstone or an abrasive. By thus even further enhancing the machining precision, a ceramic diffractive optical element can be manufactured that has enhanced optical characteristics. The grindstone or abrasive (loose abrasive) used may be a grindstone or abrasive that includes diamond, cBN, silicon carbide, aluminum oxide, silicon oxide, cemented carbide, cerium oxide, or another hard material.

The ceramic diffractive optical element manufactured by the method described above for manufacturing a diffractive optical element may include a ceramic as the main component thereof and include residual impurities, or may be composed of a ceramic as the main component, a sintering aid and other additives, and residual impurities. Accordingly, the abovementioned starting material powder may be a powder that includes a ceramic as the main component thereof as well as residual impurities, or may be a powder composed of a ceramic as the main component, a sintering aid and other additives, and residual impurities.

The diffractive optical element according to the present invention is manufactured by the method described above for manufacturing a diffractive optical element.

The diffractive optical element of the present invention is manufactured by the method for manufacturing a diffractive optical element according to the present invention described above, whereby a ceramic diffractive optical element can be manufactured that has enhanced optical characteristics by enhancing the machining precision, while the manufacturing cost is kept low, and the diffractive optical element of the present invention is therefore a ceramic diffractive optical element having excellent optical characteristics.

Effect of the Invention

As is apparent from the above description, according to the diffractive optical element of the present invention, a ceramic diffractive optical element having enhanced optical characteristics can be provided by enhancing the machining precision. According to the method for manufacturing a diffractive optical element according to the present invention, the machining precision is enhanced while the manufacturing cost is kept low, and a ceramic diffractive optical element having enhanced optical characteristics can thereby be manufactured.

Figure 1:
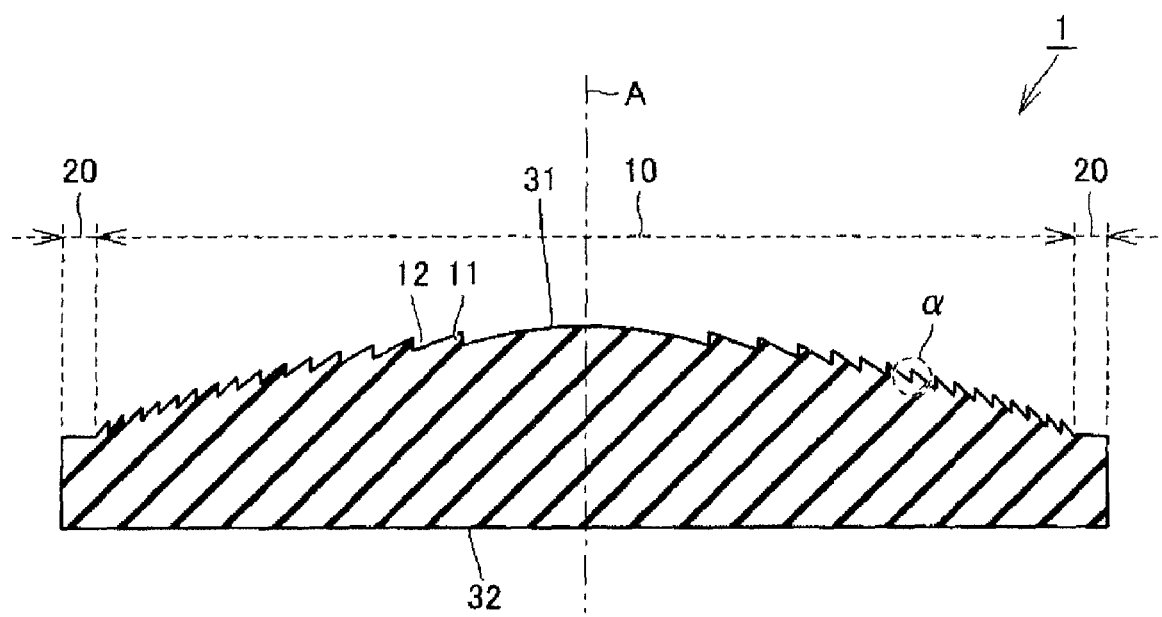
FIG. 1 is a schematic sectional view showing the structure of the diffractive optical element according to an embodiment of the present invention.

KEY TO SYMBOLS 1 diffractive optical element
2 sintered precursor
3 compression sintered body
9 die
10 optical effective area
11 prominent portion
11A tip
11C lost part
12 groove portion
12A bottom
12B surface on far side of optical axis
20 edge portion
21 starting material powder
31 one principal surface
32 other principal surface
91 part for forming prominent portion
91A bottom
92 part for forming groove portion
92A tip
92B surface on far side of optical axis A
99 gap

BEST MODE OF CARRYING OUT THE INVENTION

Embodiments of the present invention will next be described based on the accompanying drawings. The same reference numerals are used to refer to portions that are the same or equivalent in each of the drawings, and descriptions of each portion are not repeated.

The diffractive optical element according to an embodiment of the present invention will first be described with reference to FIGS. 1 and 2.

As shown in FIG. 1, the diffractive optical element 1 of the present embodiment is a diffractive optical element composed of an infrared-transmissive ceramic, in which prominent portions 11 and groove portions 12 are repeatedly formed on the surface thereof. The diffractive optical element 1 has a discoid shape, a first primary surface 31 has a convex shape, and a second primary surface 32 has a planar shape. The first primary surface 31 includes an optical effective area 10 that is the area in which the prominent portions 11 and the groove portions 12 are repeatedly formed. The optical effective area 10 is surrounded by an edge portion 20 in which the prominent portions 11 and groove portions 12 are not formed. Furthermore, the prominent portions 11 and groove portions 12 are formed on the first primary surface 31 concentrically about an optical axis A. Zinc sulfide (ZnS), zinc selenide (ZnSe), magnesium fluoride (MgF), calcium fluoride (CaF), lithium fluoride (LiF), quartz ($SiO_2$), spinel ($MgAl_2O_4$), zirconium oxide ($ZrO_2$), and other polycrystals, for example, can be used as the infrared-transmissive ceramic that constitutes the diffractive optical element 1. The shape (shape of the diffractive optical element) of the primary surface on which the prominent portions and groove portions are repeatedly formed in the diffractive optical element of the present invention, including the shape of the abovementioned first primary surface 31, may be planar, spherical, or a shape in which prominent portions and groove portions are repeatedly formed on an aspheric surface indicated by Equation (1) below.

[Eq. 1]

$$Z = \frac{C \times r^2}{1 + \sqrt{1 - (1 + K)C^2 \times r^2}} + \sum_{i=1}^{n} A_i \times r^i \quad (1)$$

(In Equation (1), C, K, and $A_i$ (i=1 to n) are aspheric coefficients.)

The average value of the surface roughness Ra within the optical effective area 10 of the surface of the diffractive optical element 1 is 0.05 μm or less, and the difference in the surface roughness Ra within the optical effective area 10 is 0.02 μm or less.

Through the configuration described above, the diffractive optical element 1 in the present embodiment is a ceramic diffractive optical element in which the optical characteristics are enhanced by enhancing the machining precision.

The surface roughness Ra within the optical effective area 10 in this instance is measured in any five locations in the direction of the prominent portions 11 and groove portions 12, i.e., the direction perpendicular to the diameter direction about the optical axis A in the first primary surface 31, without crossing the prominent portions 11 or groove portions 12, for example. The average value of the surface roughness Ra and the difference in the surface roughness Ra can be evaluated using the average of the measured values for the five locations and the difference between the maximum value and the minimum value of the surface roughness Ra, respectively. For the center, however, measurement is performed in the diameter direction straddling the optical axis A.

Figure 2:
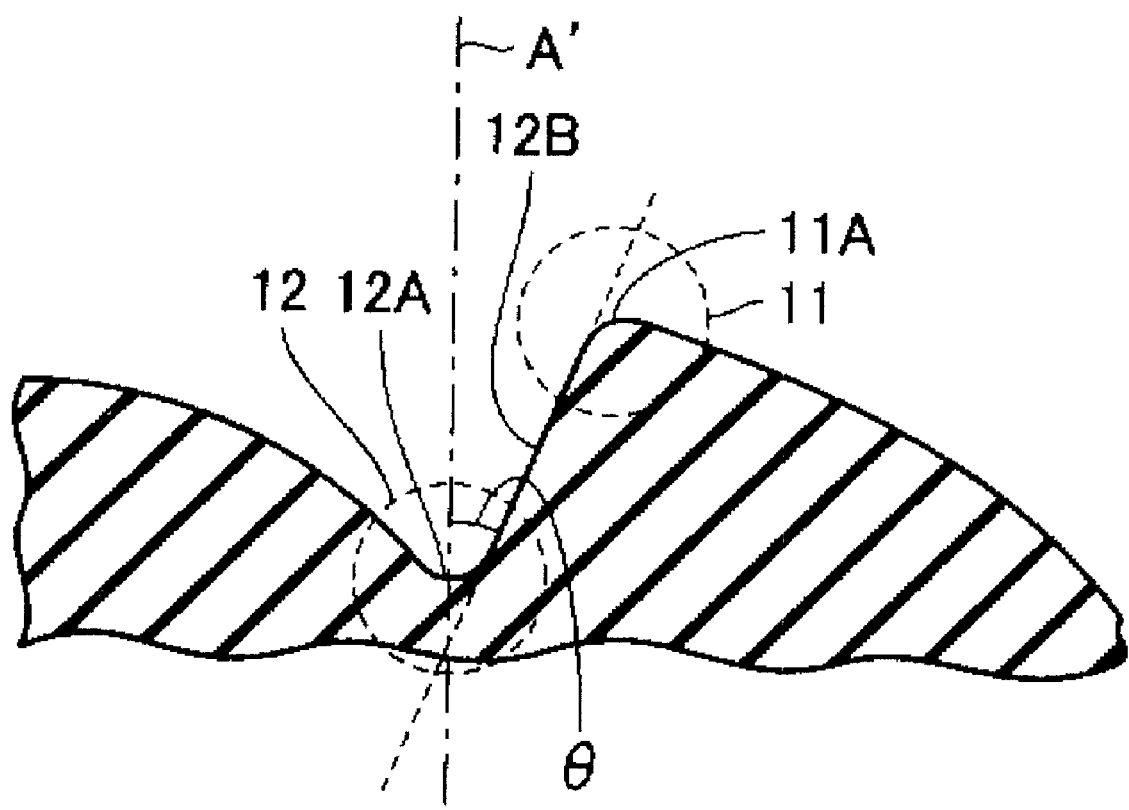
FIG. 2 is a schematic partial sectional view showing an enlarged view of region a of FIG. 1.

As shown in FIGS. 1 and 2, the diffractive optical element 1 is a sintered body of a powder composed of the abovementioned ceramic, and the tip 11A of a prominent portion 11 in a section that includes the optical axis A of the diffractive optical element 1 has a radius of curvature larger than one-half the average grain size of the powder. Moreover, the bottom 12A of a groove portion 12 in the section that includes the optical axis A of the diffractive optical element 1 has a radius of curvature larger than one-half the average grain size of the powder. The average grain size can be measured using a laser diffraction/particle size analyzer utilizing laser diffraction (LA series) manufactured by Horiba Ltd., for example.

The machining precision of the tip 11A of the prominent portion 11 and the bottom 12A of the groove portion 12 is thereby enhanced, and the optical characteristics of the diffractive optical element are further enhanced.

Furthermore, as shown in FIG. 2, a surface 12B on the far side of the optical axis A at the bottom 12A of the groove portion 12 in the section that includes the optical axis A of the diffractive optical element 1 tilts further away from the optical axis A as the distance from the bottom 12A increases, and the surface 12B and a straight line A' parallel to the optical axis A form an angle θ 7° or larger and 75° or smaller. Demolding is thereby facilitated when the prominent portions 11 and groove portions 12 are molded by confinement in a die.

The method for manufacturing a diffractive optical element according to an embodiment of the present invention will next be described.

Figure 3:
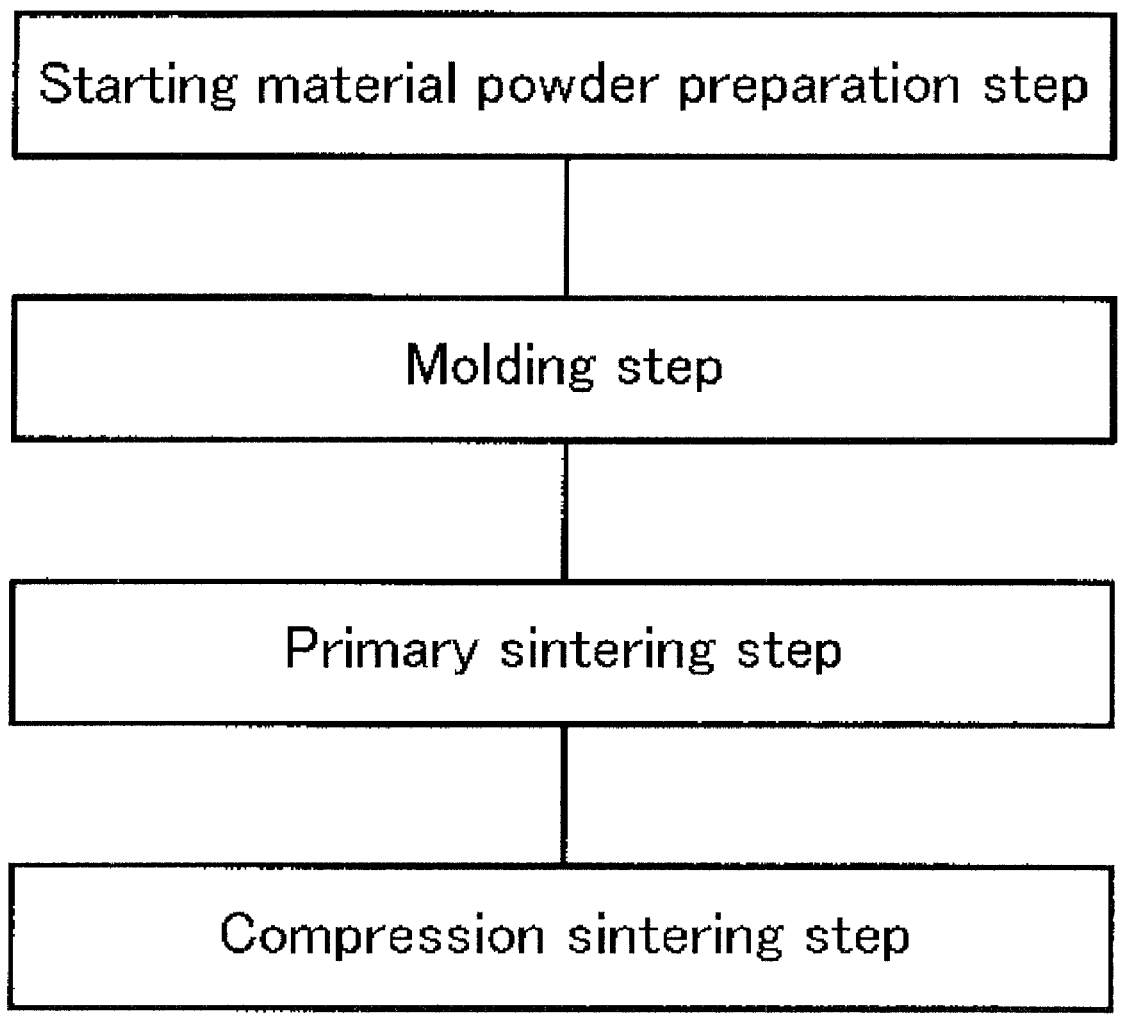
FIG. 3 is a flowchart showing an overview of the method for manufacturing a diffractive optical element according to an embodiment of the present invention.

As shown in FIG. 3, a starting material powder preparation step in which a starting material powder comprising a ceramic is prepared is first performed in the method for manufacturing a diffractive optical element according to the present embodiment. Specifically, a ceramic powder having the starting material powder as the main component thereof, e.g., a ZnS powder, is prepared.

Then, as shown in FIG. 3, a molding step is performed in which a molded body is fabricated by molding the ceramic starting material powder. Specifically, the abovementioned powder is molded by a hydraulic press method using a hard metal die composed of cemented carbide, tool steel, or the like, for example, and a molded body having the general shape of the diffractive optical element is fabricated.

A primary sintering step is then performed in which the molded body is heat treated and a sintered precursor is fabricated, as shown in FIG. 3. Specifically, the molded body fabricated as described above is subjected to a heat treatment in which the molded body is heated to a temperature of 500° C. or higher and 1100° C. or lower in a vacuum of 30 Pa or less, and the temperature is maintained for 1 hour or more and 10 hours or less, for example, and a sintered precursor is fabricated. The sintered precursor is preferably endowed with a density of 55 to 80 volume % by the heat treatment in the primary sintering step. Under such conditions, variation of the grain size of the starting material powder is extremely low.

Then, as shown in FIG. 3, a compression sintering step is performed in which the sintered precursor is deformed by being compressed and heated while confined in a die, and a compressed sintered body is fabricated. Specifically, as shown in FIG. 4, the sintered precursor 2 fabricated as described above is heated to a temperature that is, e.g., no less than 30% of the melting temperature or sublimation point of the starting material powder, and no higher than the melting point or sublimation point thereof, and compressed at a pressure of 1 MPa or higher and 300 MPa or lower while being confined in a die 9 that includes a part 91 for forming a prominent portion, which is used to form the prominent portions 11 of the diffractive optical element 1; and a part 92 for forming a groove portion, which is used to form the groove portions 12; and a compressed sintered body is fabricated having a shape more similar to that of the finished diffractive optical element 1 than the sintered precursor 2.

Figure 5:
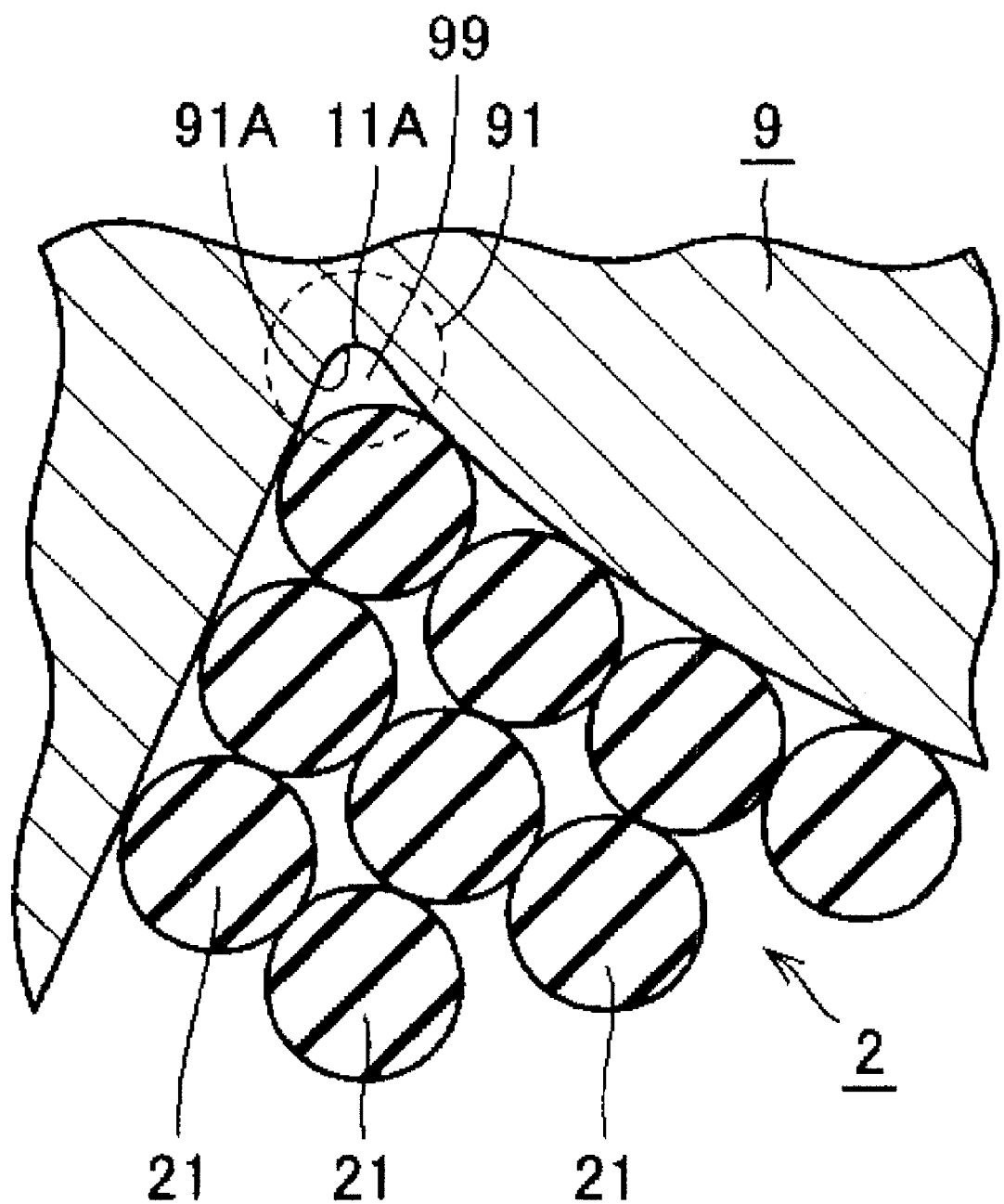
FIG. 5 is a schematic partial sectional view showing an enlarged view of the vicinity of region β of FIG. 4 in the compression sintering step.
Figure 6:
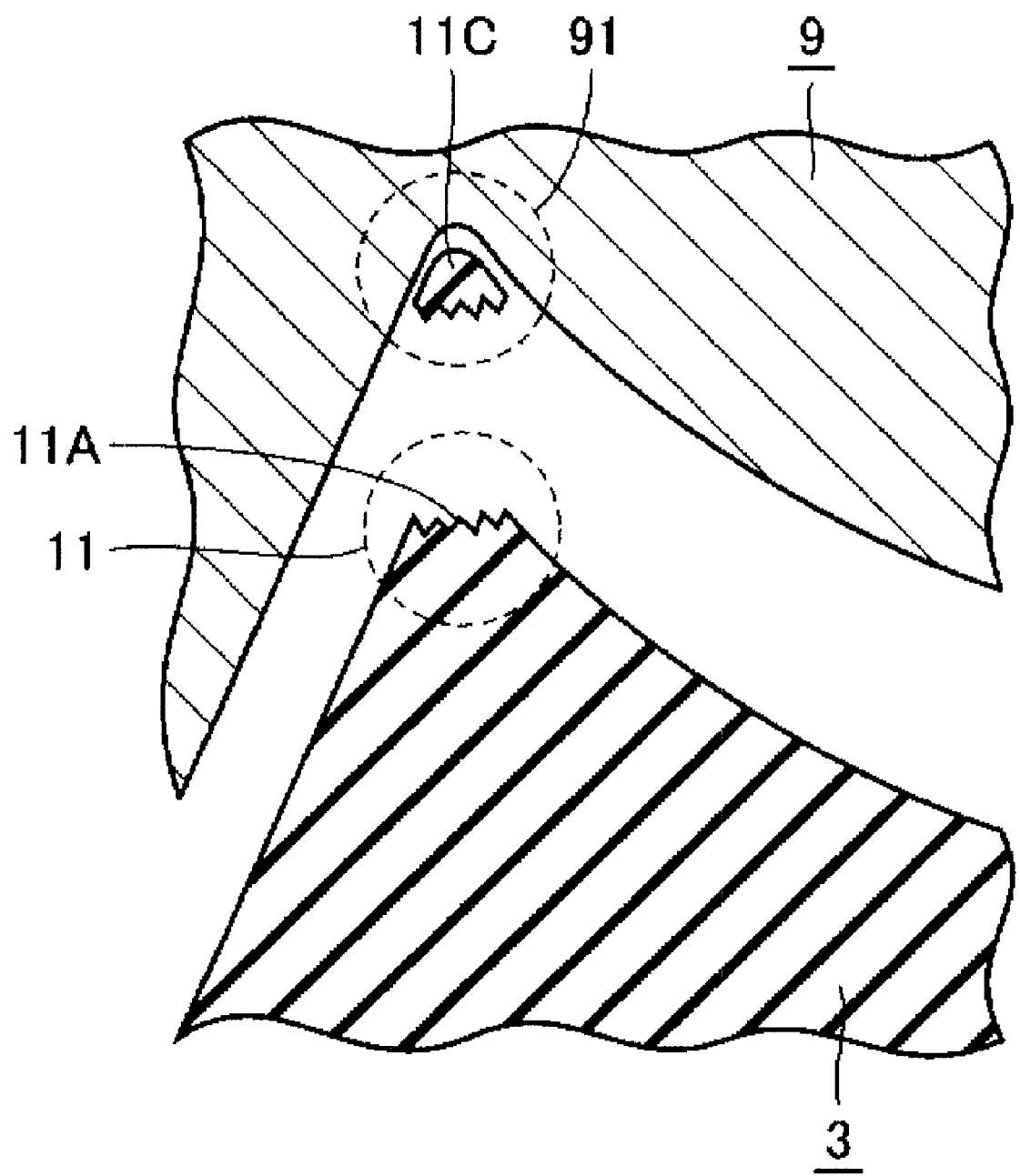
FIG. 6 is a schematic partial sectional view showing an enlarged view of the vicinity of region β of FIG. 4 in the compression sintering step.

In this instance, when the radius of curvature of the bottom 91A of the part 91 for forming a prominent portion in the section that includes the optical axis A of the sintered precursor 2 confined in the die 9 is one-half or less of the average grain size of the starting material powder 21, as shown in FIG. 5, a gap 99 is formed in the vicinity of the tip 11A of the prominent portion 11 when the sintered precursor 2 is confined and deformed by the die 9, and the ability of the sintered precursor 2 composed of the starting material powder 21 to conform to the die 9 is reduced. As a result, there is a risk of reduced shape transfer precision in the vicinity of the tip 11A of the prominent portion 11. Furthermore, since the starting material powder 21 is not adequately packed in the vicinity of the bottom 91A of the part 91 for forming a prominent portion, the strength near the tip 11A of the prominent portion 11 is reduced, and cracking can occur at the tip 11A of the prominent portion 11 when the fabricated compressed sintered body 3 is demolded from the die 9, as shown in FIG. 6. As a result, a lost part 11C remains in the vicinity of the bottom 91A of the part 91 for forming a prominent portion, the die 9 is contaminated, and there is a risk of damage occurring in the vicinity of the bottom 91A of the part 91 for forming a prominent portion due to the lost part 11C when the die 9 is used again.

Figure 4:
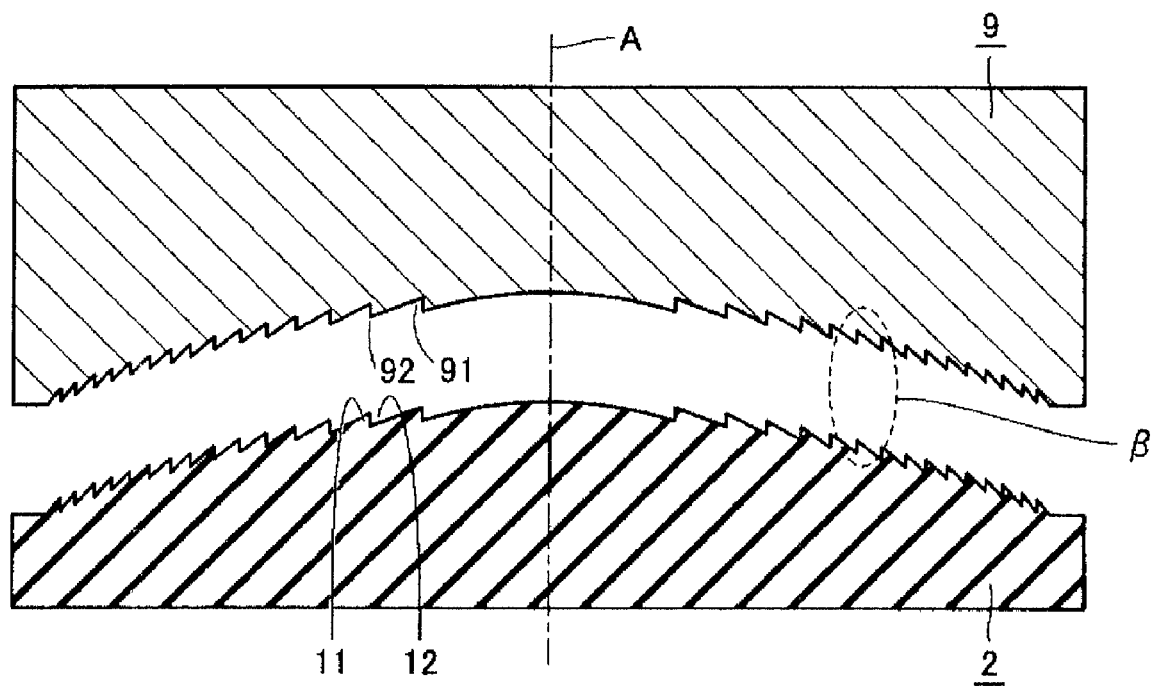
FIG. 4 is a schematic sectional view showing the compression sintering step of FIG. 3.
Figure 7:
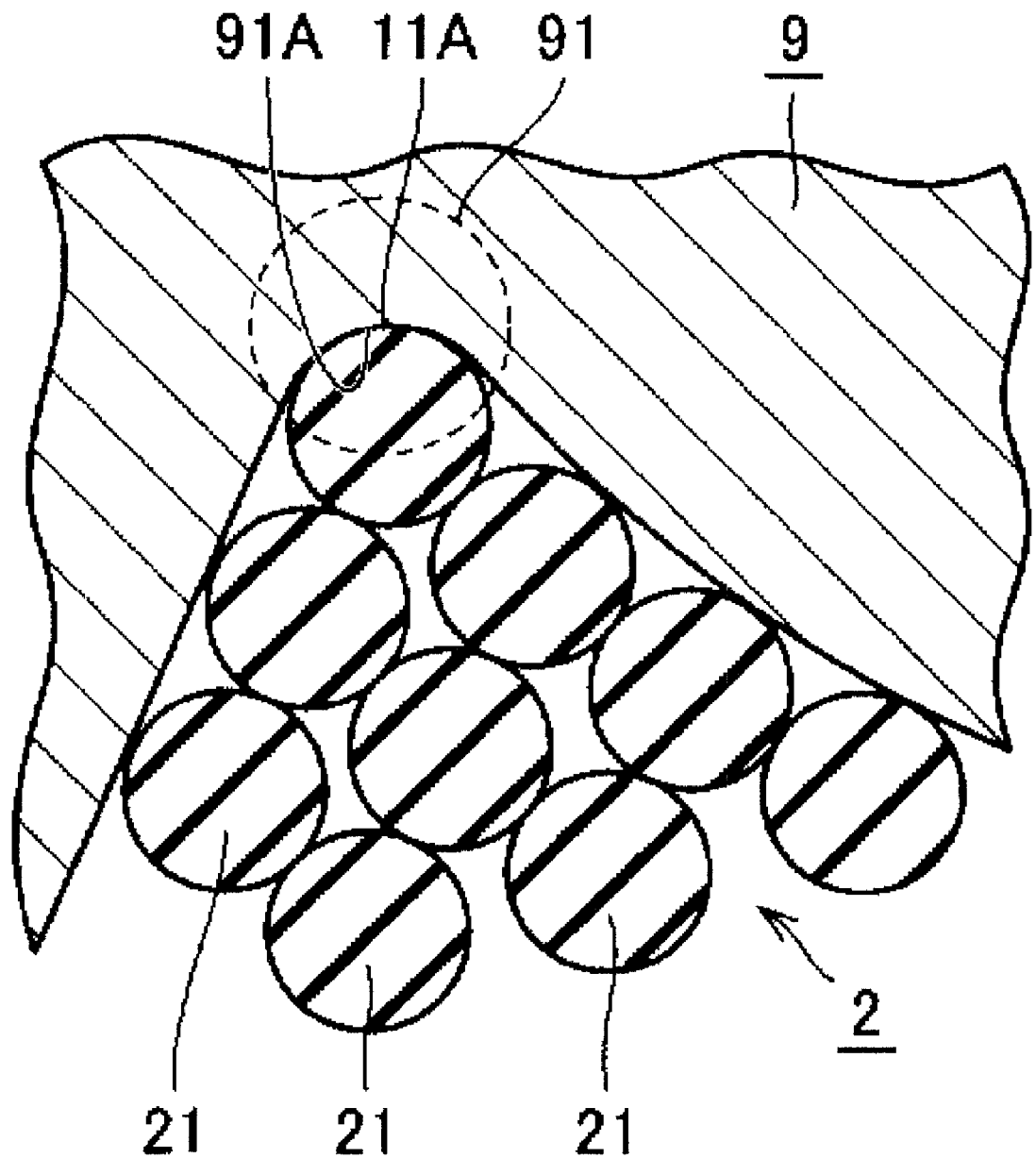
FIG. 7 is a schematic partial sectional view showing an enlarged view of the vicinity of region β of FIG. 4 in the compression sintering step.
Figure 8:
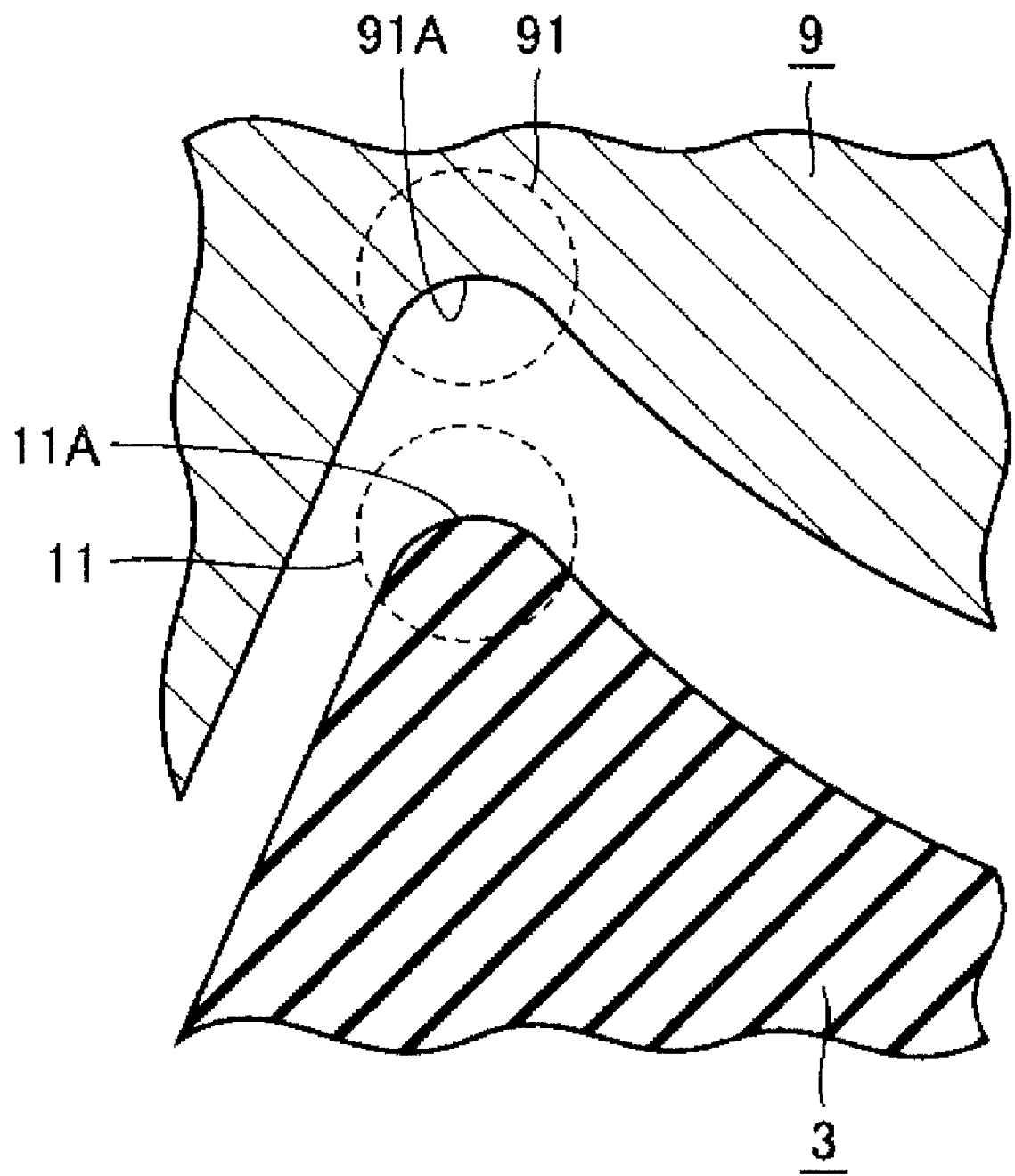
FIG. 8 is a schematic partial sectional view showing an enlarged view of the vicinity of region β of FIG. 4 in the compression sintering step.

In contrast, in the method for manufacturing a diffractive optical element according to the present embodiment, the bottom 91A of the part 91 for forming a prominent portion of the die 9 in the section that includes the optical axis A of the sintered precursor 2 confined in the die 9 has a radius of curvature larger than one-half the average grain size of the starting material powder 21, as shown in FIGS. 4 and 7. Therefore, the ability of the sintered precursor 2 composed of the starting material powder 21 to conform to the die 9 when the sintered precursor 2 is confined and deformed by the die 9 is enhanced, and the shape transfer precision in the vicinity of the tip 11A of the prominent portion 11 is enhanced, as shown in FIG. 7. Furthermore, since the starting material powder 21 is adequately packed in the vicinity of the bottom 91A of the part 91 for forming a prominent portion, the occurrence of cracking at the tip 11A of the prominent portion 11 when the fabricated compressed sintered body 3 is demolded from the die 9 is suppressed, as shown in FIG. 8. As a result, the machining precision of the diffractive optical element 1 can be enhanced, contamination of or damage to the die 9 can be suppressed, the durability of the die 9 can be enhanced, and the manufacturing cost of the diffractive optical element 1 can be kept low.

Figure 9:
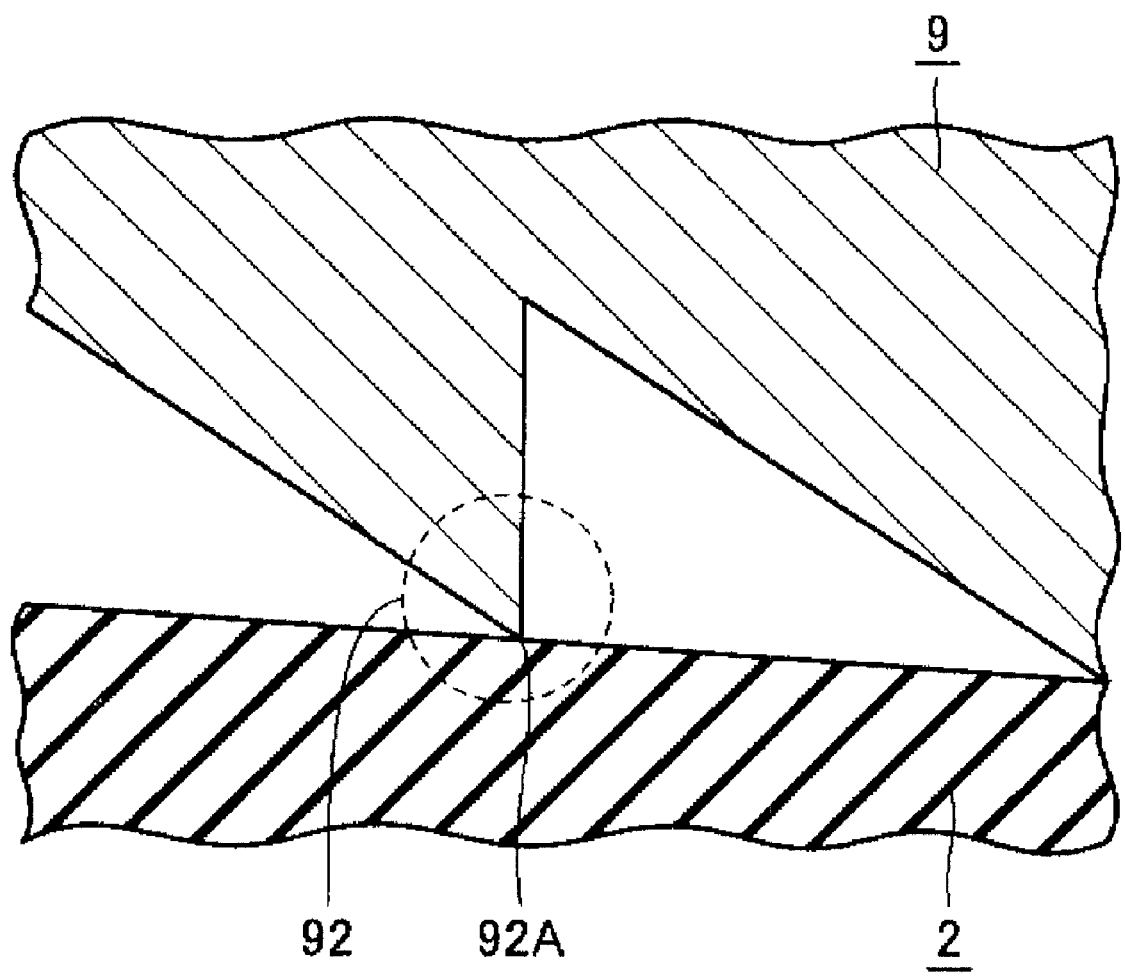
FIG. 9 is a schematic partial sectional view showing an enlarged view of the vicinity of region β of FIG. 4 in the compression sintering step.

Furthermore, as shown in FIG. 9, when the radius of curvature of the tip 92A of the part 92 for forming a groove portion in the section that includes the optical axis A of the sintered precursor 2 confined in the die 9 is one-half or less of the average grain size of the starting material powder 21, the ability of the sintered precursor 2 to conform to the die 9 is reduced, and there is a risk of reduced shape transfer precision in the diffractive optical element 1, the same as in the case of the part 91 for forming a prominent portion described above. Stress is also concentrated at the tip 92A of the part 92 for forming a groove portion when the die 9 is in contact with the sintered precursor 2. As a result, there is a risk of damage to the die 9 occurring at the tip 92A of the part 92 for forming a groove portion.

Figure 10:
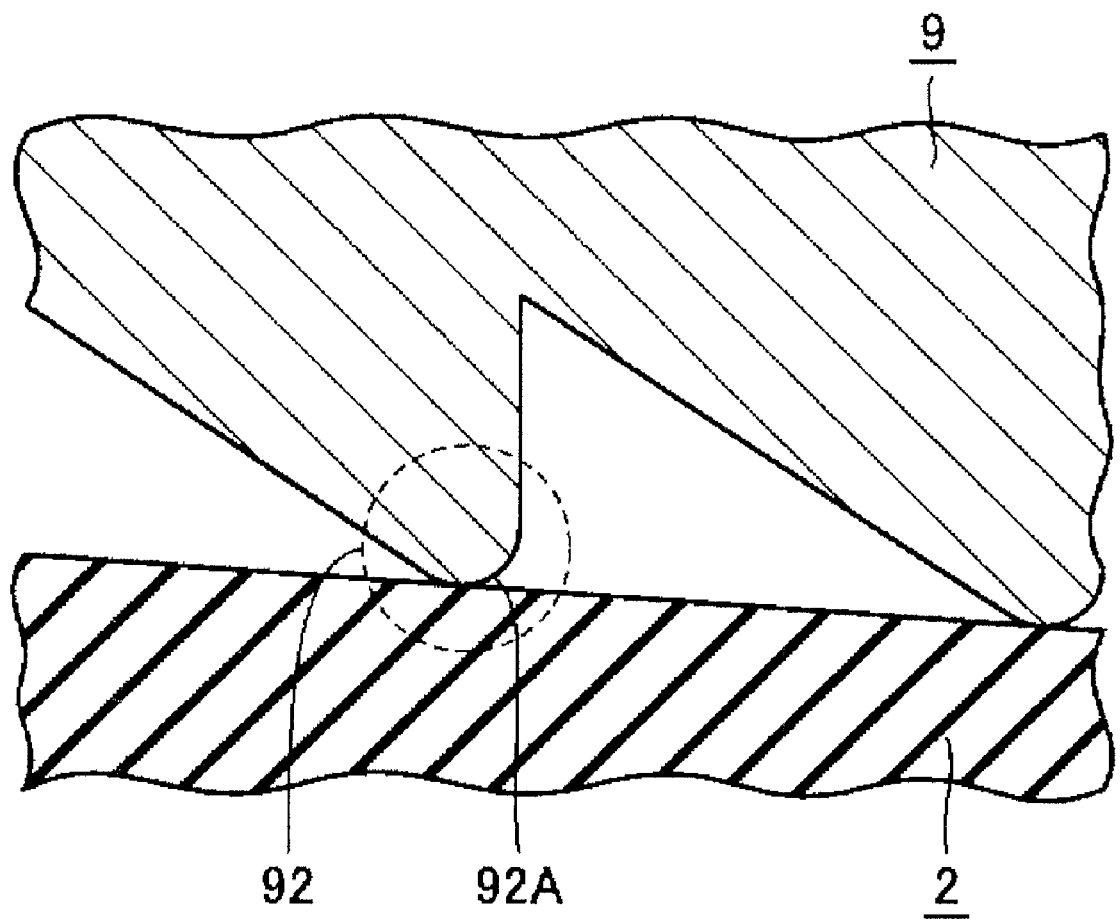
FIG. 10 is a schematic partial sectional view showing an enlarged view of the vicinity of region β of FIG. 4 in the compression sintering step.

In contrast, in the method for manufacturing a diffractive optical element according to the present embodiment, the tip 92A of the part 92 for forming a groove portion in the section that includes the optical axis A of the sintered precursor 2 confined in the die 9 has a radius of curvature larger than one-half the average grain size of the starting material powder 21, as shown in FIGS. 4 and 10. The ability of the sintered precursor 2 to conform to the die 9 is therefore enhanced, and the shape transfer precision of the diffractive optical element 1 is enhanced, the same as in the case of the part 91 for forming a prominent portion described above. Moreover, less stress is concentrated at the tip 92A of the part 92 for forming a groove portion when the die 9 is in contact with the sintered precursor 2, as shown in FIG. 10. As a result, since damage to the die 9 at the tip 92A of the part 92 for forming a groove portion is prevented, the durability of the die 9 can be enhanced, and the manufacturing cost of the diffractive optical element 1 can be kept low.

Figure 11:
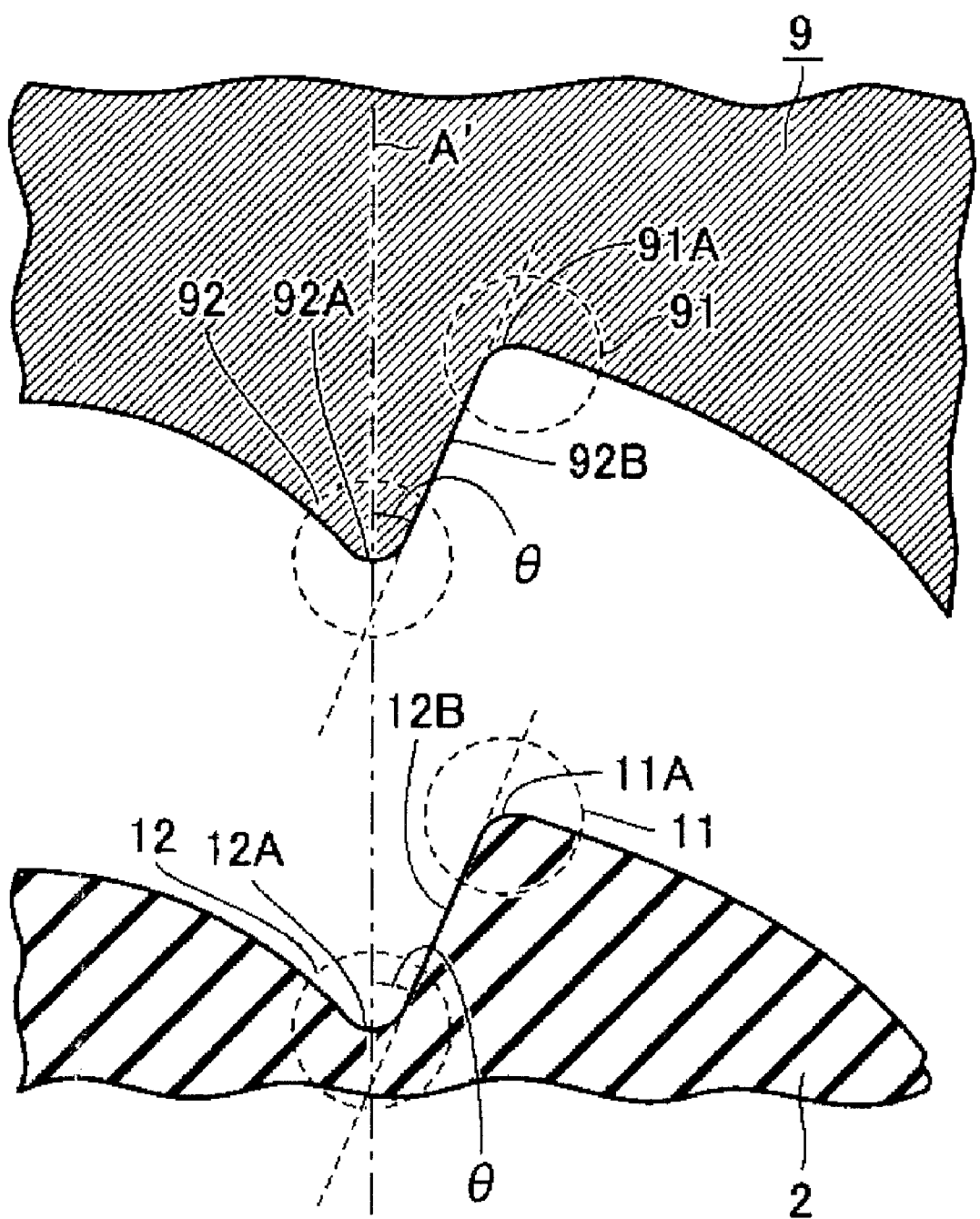
FIG. 11 is a schematic partial sectional view showing an enlarged view of the vicinity of region β of FIG. 4 in the compression sintering step.

As shown in FIGS. 4 and 11, a surface 92B on the far side of the optical axis A at the tip 92A of the part 92 for forming a groove portion in the section that includes the optical axis A of the sintered precursor 2 confined in the die 9 tilts further away from the optical axis A as the distance from the tip 92A increases, and the surface 92B and a straight line A' parallel to the optical axis A form an angle $\theta 7°$ or larger and 75° or smaller. The compressed sintered body fabricated by deforming the sintered precursor 2 is therefore easily released (demolded) from the die 9.

According to the method for manufacturing a diffractive optical element according to the present embodiment as described above, a diffractive optical element 1 having enhanced optical characteristics can be manufactured while the manufacturing cost is kept low by enhancing the shape transfer precision.

Example 1

Example 1 of the present invention will next be described. An experiment was conducted to compare the roughness of the surface of a ceramic sintered body obtained by sintering in a case in which molding was performed using a die to form the prominent portions and groove portions of a diffractive optical element, and a case in which the prominent portions and groove portions were formed by cutting. The procedure of the experiment is described below.

First, sintered precursors were fabricated by performing the starting material powder preparation step, the molding step, and the primary sintering step in the same manner as in the method for manufacturing a diffractive optical element according to the embodiment of the present invention described above with reference to FIG. 3. The ceramics used as the primary component of the starting material powder were ZnS, ZnSe, $MgF_2$, and $CaF_2$. As Examples of the present invention, sintered precursors were subjected to die molding (the compression sintering step in the embodiment described above) by the same method as in the embodiment described above, and diffractive optical elements were fabricated having a lens shape 10 mm in diameter, and prominent portions and groove portions repeatedly formed on the surface thereof (Examples A through D).

In the molding using a die, the sintered precursors were deformed and molded while being compressed and heated in a vacuum compression sintering furnace using a die composed of silicon carbide or glassy carbon and ground on the surface thereof by a grindstone that included diamond, and diffractive optical elements were fabricated. The heating temperature and pressure were appropriately selected from the ranges of 600 to 1600° C. and 5 to 300 MPa, according to the material of the sintered precursor.

As Comparative Examples not using the ranges of the present invention, the sintered precursors were molded by cutting using a single-crystal diamond turning tool, and diffractive optical elements were fabricated having a lens shape 10 mm in diameter, and prominent portions and groove portions repeatedly formed on the surface thereof (Comparative Examples A through D).

The surface roughness (Ra) of the fabricated diffractive optical elements (samples) of Examples and Comparative Examples was then measured. The locations measured were at distances 0 mm (center), 1 mm, 2 mm, 3 mm, 4 mm, and 5 mm from the center in the radial direction. The surface roughness Ra is the value obtained by cutting out from the roughness curve a certain reference length in the direction in which the average line extends, adding together the distances (absolute value of the deviation) from the average line to the roughness curve in the cut-out portion, and averaging the sum over the reference length. The surface roughness Ra can be measured by a method in accordance with JIS B 0601 using a Form Talysurf (PGI series, manufactured by Taylor Hobson), for example.

The experiment results will next be described. Table 1 shows the results of measuring the surface roughness in the experiment described above. Table 1 shows the surface roughness Ra at each measurement position (units: μm). As shown in Table 1, in the samples of Comparative Examples A through D fabricated by cutting using a single-crystal diamond turning tool, the surface roughness Ra in each case was 0.06 μm or greater, the average of the measured values from six locations was 0.082 to 0.093 μm, and the difference (spread) between the maximum values and the minimum values was 0.039 to 0.043 μm. Specifically, Comparative Examples A through D did not satisfy the conditions of a surface roughness Ra average value of 0.05 μm or less and a difference in surface roughness of 0.02 μm or less for the diffractive optical element of the present invention. This result indicates that the method of fabrication by cutting is incapable of adequately reducing the average surface roughness and spread in surface roughness even when a single-crystal diamond turning tool is used.

In contrast, in the samples of Examples A through D fabricated by molding using a die, the surface roughness Ra in each case was 0.035 μm or less, the average of the measured values from six locations was 0.029 to 0.032 μm, and the difference (spread) between the maximum values and the minimum values was 0.004 to 0.006 μm. Specifically, Example A through D satisfied the conditions of a surface roughness Ra average value of 0.05 μm or less and a difference in surface roughness of 0.02 μm or less for the diffractive optical element of the present invention. From this result, it was confirmed that through the manufacturing method in Examples of the present invention in which die molding was employed, a diffractive optical element having enhanced optical characteristics can be manufactured by adequately reducing the average value and spread of the surface roughness.

Example 2

Example 2 of the present invention will next be described. An experiment was conducted to investigate the relationships between the grain size of the starting material powder, the diameter of curvature of the bottom of the part for forming a prominent portion of the die used, the ability of the sintered precursor to conform to the die, and the state of contamination of the die and damage to the tip of the prominent portion. The procedure of the experiment is described below.

First, sintered precursors were fabricated by performing the starting material powder preparation step, the molding step, and the primary sintering step in the same manner as in the method for manufacturing a diffractive optical element according to the embodiment of the present invention described above with reference to FIG. 3. Zinc sulfide was used as the ceramic constituting the main component of the starting material powder. Sintered precursors were subjected to die molding (the compression sintering step in the embodiment described above) by the same method as in the embodiment described above, and diffractive optical elements were fabricated having a lens shape 10 mm in diameter, and prominent portions and groove portions repeatedly formed on the surface thereof. Starting material powders having an average grain size of 1 μm and 2 μm were used. In the die used, the diameter of curvature of the bottom of the part for forming a prominent portion was 0.5 to 4 μm. The ability of the sintered precursor to conform to the die, and the state of contamination of the die and damage to the tip of the prominent portion were investigated.

The experiment results will next be described. Table 2 shows the results obtained in the experiment described above.

TABLE 1

| | | Distance (mm) from center | | | | | | | Difference |
|---|---|---|---|---|---|---|---|---|---|
| | Material | 0 | 1 | 2 | 3 | 4 | 5 | Average | (spread) |
| Example A | ZnS | 0.032 | 0.031 | 0.029 | 0.029 | 0.027 | 0.026 | 0.029 | 0.006 |
| Example B | ZnSe | 0.031 | 0.031 | 0.03 | 0.028 | 0.027 | 0.027 | 0.029 | 0.004 |
| Example C | MgF$_2$ | 0.035 | 0.033 | 0.033 | 0.031 | 0.03 | 0.029 | 0.032 | 0.006 |
| Example D | CaF$_2$ | 0.034 | 0.034 | 0.032 | 0.032 | 0.03 | 0.03 | 0.032 | 0.004 |
| Comparative Example A | ZnS | 0.104 | 0.095 | 0.088 | 0.079 | 0.071 | 0.061 | 0.083 | 0.043 |
| Comparative Example B | ZnSe | 0.101 | 0.094 | 0.089 | 0.075 | 0.068 | 0.062 | 0.082 | 0.039 |
| Comparative Example C | MgF$_2$ | 0.111 | 0.101 | 0.092 | 0.083 | 0.077 | 0.069 | 0.089 | 0.042 |
| Comparative Example D | CaF$_2$ | 0.115 | 0.108 | 0.094 | 0.088 | 0.081 | 0.074 | 0.093 | 0.041 |

In the "Conformity" column of Table 2, "A" indicates a less than 5% error in the diameter of curvature at the tip of the prominent portion of the fabricated diffractive optical element with respect to the diameter of curvature of the bottom of the part for forming a prominent portion of the die, and "C" indicates an error of 5% or greater. In the "Tip breakage" column of Table 2, "A" indicates that breakage of the tip (loss of the tip) of the prominent portion of the diffractive optical element was not observed, and "C" indicates that breakage of the tip of the prominent portion was observed when twenty diffractive optical elements were fabricated. In the "Die contamination" column of Table 2, "A" indicates that the ceramic constituting the diffractive optical element was found adhering to the bottom of the part for forming a prominent portion of the die after twenty diffractive optical elements were fabricated, "B" indicates that such adhesion was observed but was removable by washing, and "C" indicates that adhesion was observed but could not be removed by washing.

TABLE 2

|  | Average grain size of starting material powder (μm) | Diameter of curvature of tip (μm) | Conformity | Tip breakage | Die contamination |
|---|---|---|---|---|---|
| Condition 1 | 1 | 1 | A | A | B |
| Condition 2 | 1 | 2 | A | A | A |
| Condition 3 | 1 | 0.5 | C | C | C |
| Condition 4 | 2 | 2 | A | A | A |
| Condition 5 | 2 | 4 | A | A | A |
| Condition 6 | 2 | 0.5 | C | C | C |
| Condition 7 | 2 | 1 | C | C | B |

As shown in Table 2, satisfactory results were not obtained in the "Conformity" and "Tip breakage" columns for Conditions 3, 6, and 7, in which the diameter of curvature of the bottom of the part for forming a prominent portion was less than the average grain size of the starting material powder (the radius of curvature of the bottom of the part for forming a prominent portion was less than ½ the average grain size of the starting material powder), whereas satisfactory results were obtained in the "Conformity" and "Tip breakage" columns for Conditions 1, 2, 4, and 5, in which the diameter of curvature of the bottom of the part for forming a prominent portion was equal to or greater than the average grain size of the starting material powder (the radius of curvature of the bottom of the part for forming a prominent portion was ½ or more of the average grain size of the starting material powder). Based on these results, it is considered preferred that the bottom of the part for forming a prominent portion have a radius of curvature larger than one-half the average grain size of the starting material powder. Furthermore, from the perspective of more reliably preventing "die contamination," the bottom of the part for forming a prominent portion preferably has a radius of curvature larger than the average grain size of the starting material powder.

Example 3

Example 3 of the present invention will next be described. An experiment was conducted to investigate the relationships between the grain size of the starting material powder, the diameter of curvature of the tip of the part for forming a grooved portion of the die, the ability of the sintered precursor to conform to the die, and the durability of the die. The procedure of the experiment is described below.

First, sintered precursors were fabricated in the same manner as in Example 2. The sintered precursors were subjected to die molding (the compression sintering step in the embodiment described above) by the same method as in the embodiment described above, and diffractive optical elements were fabricated having a lens shape 10 mm in diameter, and prominent portions and groove portions repeatedly formed on the surface thereof. Starting material powders having an average grain size of 1 μm and 2 μm were used. In the die used, the diameter of curvature of the tip of the part for forming a groove portion was 0.5 to 4 μm. The ability of the sintered precursor to conform to the die and the durability of the die were investigated.

The experiment results will next be described. Table 3 shows the results obtained in the experiment described above. In the "Conformity" column of Table 3, "A" indicates a less than 5% error in the diameter of curvature at the tip of the groove portion of the fabricated diffractive optical element with respect to the diameter of curvature of the bottom of the part for forming a groove portion of the die, and "C" indicates an error of 5% or greater. In the "Durability" column of Table 3, "A" that 100 or more diffractive optical elements were fabricated without damage to the tip of the part for forming a groove portion, "B" indicates that 10 or more and 99 or fewer diffractive optical elements were fabricated without such damage, and "C" indicates that 9 or fewer diffractive optical elements were fabricated without such damage.

TABLE 3

|  | Average grain size of starting material powder (μm) | R diameter of tip of die diffraction groove (μm) | Conformity | Durability |
|---|---|---|---|---|
| Condition 1 | 1 | 1 | A | B |
| Condition 2 | 1 | 2 | A | A |
| Condition 3 | 1 | 0.5 | C | C |
| Condition 4 | 2 | 2 | A | A |
| Condition 5 | 2 | 4 | A | A |
| Condition 6 | 2 | 0.5 | C | C |
| Condition 7 | 2 | 1 | C | B |

As shown in Table 3, satisfactory results were not obtained for "Conformity" in Conditions 3, 6, and 7, in which the diameter of curvature of the tip of the part for forming a groove portion was less than the average grain size of the starting material powder (the radius of curvature of the tip of the part for forming a groove portion was less than ½ the average grain size of the starting material powder), whereas satisfactory results were obtained for "Conformity" in Conditions 1, 2, 4, and 5, in which the diameter of curvature of the tip of the part for forming a groove portion was equal to or greater than the average grain size of the starting material powder (the radius of curvature of the tip of the part for forming a groove portion was ½ or more of the average grain size of the starting material powder). Based on these results, it is considered preferred that the tip of the part for forming a groove portion have a radius of curvature larger than one-half the average grain size of the starting material powder. Furthermore, from the perspective of further enhancing "durability," the tip of the part for forming a groove portion is preferably 2 μm or larger.

Example 4

Example 4 of the present invention will next be described. An experiment was conducted to investigate the relationships between the draft, which is the angle θ (see FIG. 11) formed by the surface on the far side from the optical axis in a section that includes the optical axis of the diffractive optical element, and a straight line parallel to the optical axis; the ease of demolding (demolding properties) of the molded diffractive optical element; and the optical characteristics. The procedure of the experiment is described below.

First, sintered precursors were fabricated in the same manner as in Examples 2 and 3. The sintered precursors were subjected to die molding (the compression sintering step in the embodiment described above) by the same method as in the embodiment described above, and diffractive optical elements were fabricated having a lens shape 10 mm in diameter, and prominent portions and groove portions repeatedly formed on the surface thereof. The draft of the die was varied in a range of 0 to 80° during molding of the diffractive optical elements, the demolding properties were investigated, and the MTF (Modulation Transfer Function) of each obtained diffractive optical element was measured. The MTF indicates the spatial frequency resolution, and a higher quality image results in a higher MTF. This MTF can be measured using an MTF measurement device for infrared lenses (YY-305, manufactured by Yucaly Optical Laboratory, Inc.), for example.

The experiment results will next be described. Table 4 shows the results obtained in the experiment described above. In the "Demolding properties" column of Table 4, "A" indicates that the diffractive optical element could be separated from the die by the suction of a vacuum pin set after die molding, and "C" indicates that the diffractive optical element could not be separated from the die. The "MTF decrease rate" column indicates the rate of decrease in the measured MTF based on a case in which the draft is 0°. The optical loss has no practical effect on the image if the MTF decrease is less than 4.5%.

TABLE 4

| Draft (°) | Demolding properties | MTF decrease rate (%) |
| --- | --- | --- |
| 0 | C | 0 |
| 6 | C | 0.1 |
| 7 | A | 0.1 |
| 15 | A | 0.3 |
| 45 | A | 1.2 |
| 60 | A | 2.0 |
| 75 | A | 4.3 |
| 80 | A | 6.8 |

As shown in Table 4, it is apparent that the demolding properties are satisfactory when the draft is 7° or greater, and that the MTF reduction rate increases as the draft increases. The MTF decrease rate exceeds 4.5% when the draft is over 75°. Consequently, a draft of 7° or greater and 75° or less is preferred in terms of simultaneously enhancing the demolding properties and suppressing the effects of the draft on the image. From the perspective of ensuring the reliability of the demolding properties, the draft is preferably 10° or greater and 15° or less. From the perspective of even further suppressing the effects of the draft on the image, the draft is preferably 60° or less, and more preferably 45° or less.

A plano-convex spherical shape is shown in the drawings, and the diffractive optical element was described based on this shape as an example of the shape of the diffractive optical element of the present invention in the embodiment and Examples described above, but the diffractive optical element of the present invention is not limited to this shape.

Figure 12:
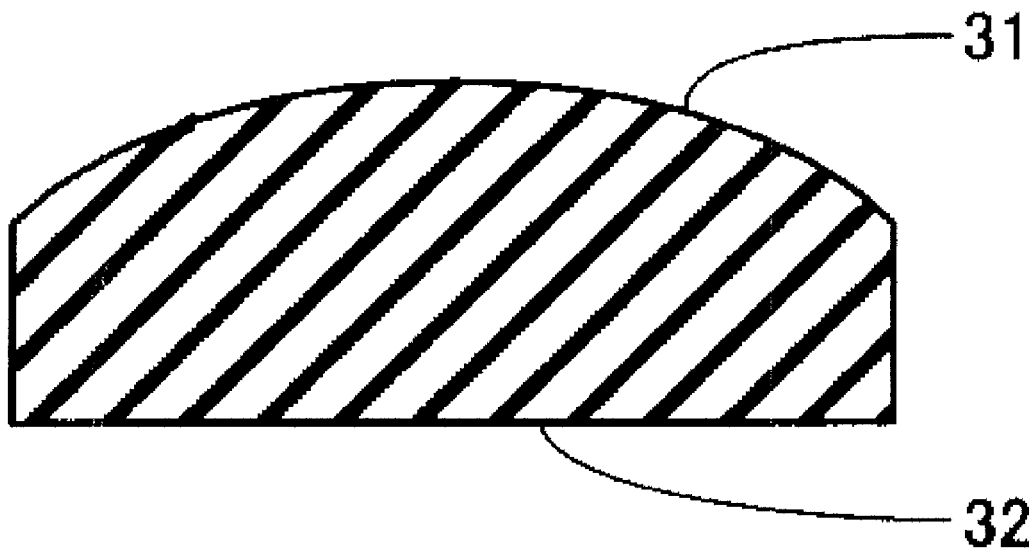
FIG. 12 is a schematic sectional view showing the shape of a plano-convex lens as an example of the shape of the diffractive optical element.
Figure 13:
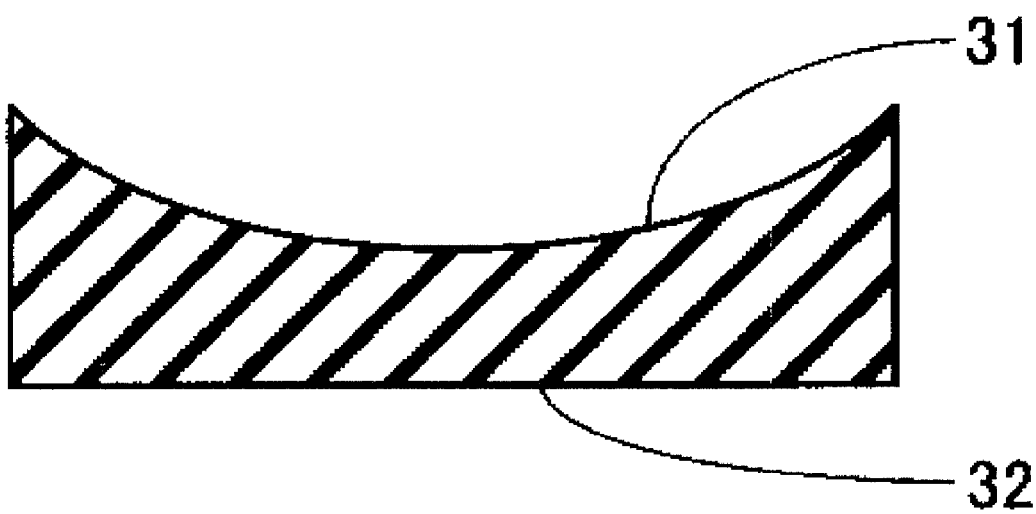
FIG. 13 is a schematic sectional view showing the shape of a plano-concave lens as an example of the shape of the diffractive optical element.
Figure 14:
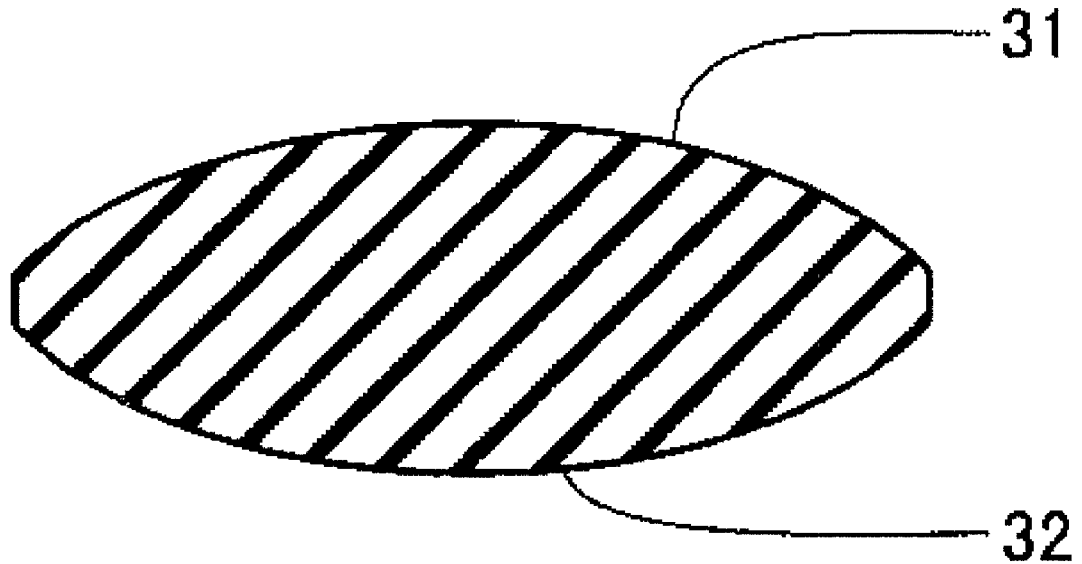
FIG. 14 is a schematic sectional view showing the shape of a double-convex lens as an example of the shape of the diffractive optical element.
Figure 15:
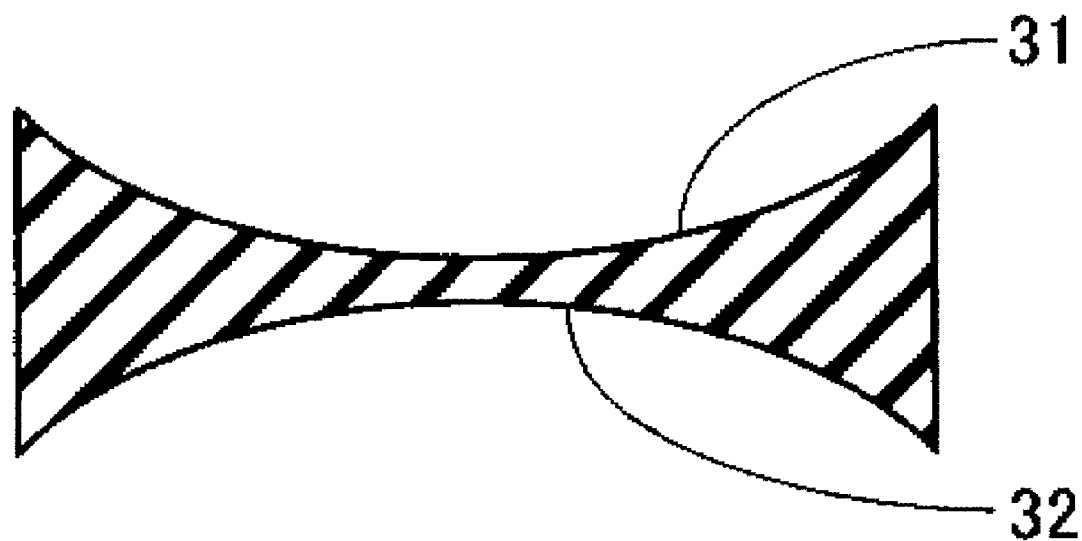
FIG. 15 is a schematic sectional view showing the shape of a double-concave lens as an example of the shape of the diffractive optical element.
Figure 16:
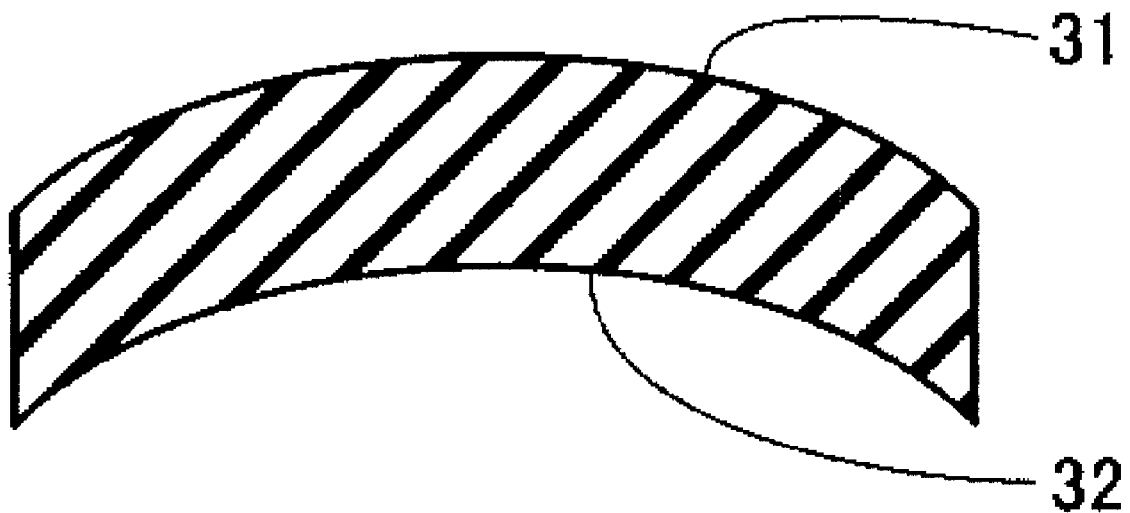
FIG. 16 is a schematic sectional view showing the shape of a concavo-convex lens as an example of the shape of the diffractive optical element.
Figure 17:
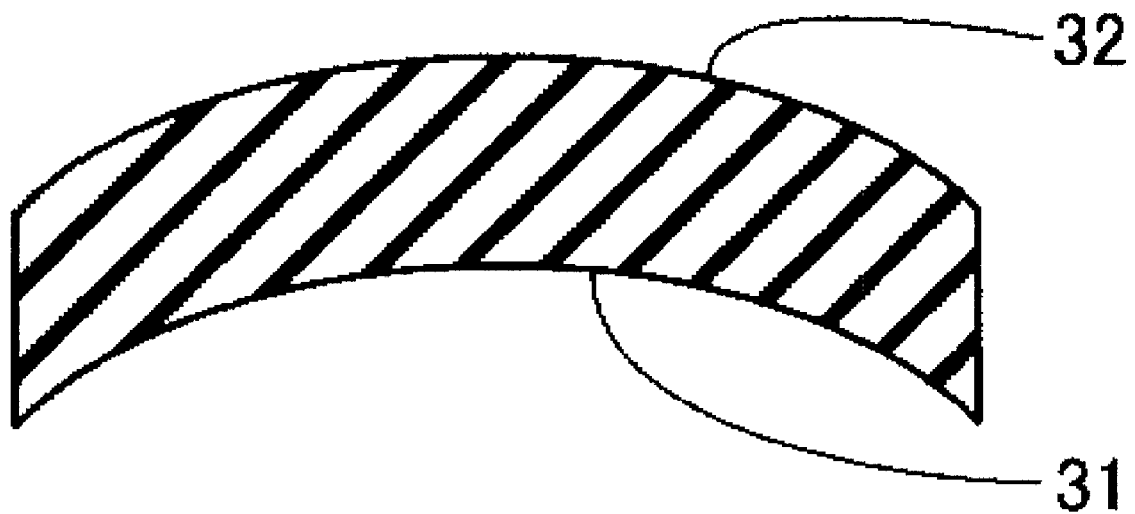
FIG. 17 is a schematic sectional view showing the shape of a concavo-convex lens as an example of the shape of the diffractive optical element.

As shown in FIGS. 12 through 17, it is possible to use the following shapes as the shape of the diffractive optical element of the present invention: a plano-convex lens in which the first primary surface 31 as the diffraction surface on which prominent portions and groove portions are repeatedly formed is convex and spherical or aspheric, and the second primary surface 32 is planar, as shown in FIG. 12; a plano-concave lens in which the first primary surface 31 as the diffraction surface is concave and spherical or aspheric, and the second primary surface 32 is planar, as shown in FIG. 13; or a double-convex lens in which the first primary surface 31 as the diffraction surface is convex and spherical or aspheric, and the second primary surface 32 is also convex and spherical or aspheric, as shown in FIG. 14. Furthermore, it is also possible to use the following shapes as the shape of the diffractive optical element of the present invention: a double-concave lens in which the first primary surface 31 as the diffraction surface is concave and spherical or aspheric, and the second primary surface 32 is also concave and spherical or aspheric, as shown in FIG. 15; a concavo-convex lens in which the first primary surface 31 as the diffraction surface is convex and spherical or aspheric, and the second primary surface 32 is concave and spherical or aspheric, as shown in FIG. 16; or a concavo-convex lens in which the first primary surface 31 as the diffraction surface is concave and spherical or aspheric, and the second primary surface 32 is convex and spherical or aspheric, as shown in FIG. 17, for example.

Specifically, the shapes shown in FIGS. 12 through 17 as well as plano-convex spherical, plano-convex aspheric, plano-concave spherical, plano-concave aspheric, double-convex spherical, double-convex aspheric, double-concave spherical, double-concave aspheric, meniscus spherical, meniscus aspheric, and various other shapes can be selected as the shape of the diffractive optical element of the present invention.

The embodiments and Examples herein disclosed are in every respect given merely as examples, and are not to be construed as limiting. The scope of the present invention is indicated by the claims and not by the above description, and the claims are intended to encompass meanings equivalent thereto as well as all modifications within the range thereof.

The diffractive optical element and method for manufacturing the same according to the present invention can be applied particularly favorably to a diffractive optical element in which excellent optical characteristics are required, and to a method for manufacturing the same.

The invention claimed is:
1. A diffractive optical element comprising:
   a sintered body of a powder containing an infrared-transmissive ceramic material, the sintered body having a principle surface that includes prominent portions and groove portions concentrically formed on the principle surface; and
   a tip of the prominent portions in a section that includes an optical axis of the diffractive optical element has a radius of curvature larger than one-half the average grain size of the powder, wherein the average value of the surface roughness Ra within an optical effective area of the principle surface is 0.05 μm or less; and the difference in the surface roughness Ra of any two areas of the optical effective area of the optical element is 0.02 μm or less.

2. The diffractive optical element according to claim 1, wherein a bottom of the groove portion in a section that includes the optical axis of the diffractive optical element has a radius of curvature larger than one-half the average grain size of the powder.

3. The diffractive optical element according to claim 1, wherein
the diffractive optical element is a sintered body of a powder containing the ceramic; and
a bottom of the groove portion in a section that includes an optical axis of the diffractive optical element has a radius of curvature larger than one-half the average grain size of the powder.

4. The diffractive optical element according to claim 1, wherein a surface on a far side of an optical axis at the bottom of the groove portion in a section that includes the optical axis of the diffractive optical element tilts further away from the optical axis as the distance from the bottom increases, and the surface and a straight line parallel to the optical axis form an angle 7° or larger and 75° or smaller.

5. A method for manufacturing a diffractive optical element having an infrared-transmissive ceramic material and prominent portions and groove portions being concentrically formed on a surface of the diffractive optical element, the method for manufacturing the diffractive optical element comprising:
preparing a molded body by molding a material powder containing the ceramic material;
heating the molded body to form a sintered precursor; and
preparing a compressed sintered body by compressing the sintered precursor while confined by a die, then heating and deforming the sintered precursor, the die including corresponding parts that form the prominent portions and the groove portions, a bottom of the corresponding parts for forming the prominent portion of the die being located in a section that includes an optical axis of the sintered precursor having a radius of curvature larger than one-half the average grain size of the material powder, and wherein the average value of a surface roughness Ra within an optical effective area of the principle surface of the sintered body is 0.05 μm or less, and the difference in the surface roughness Ra of any two areas of the optical effective area of the optical element is 0.02 μm or less.

6. The method for manufacturing a diffractive optical element according to claim 5, wherein a tip of the part for forming groove portion of the die in the section has a radius of curvature larger than one-half the average grain size of the material powder.

7. The method for manufacturing a diffractive optical element according to claim 5, wherein a surface on a far side of the optical axis at a tip of the part for forming groove portion in the section tilts further away from the optical axis as the distance from the tip increases, and the surface and a straight line parallel to the optical axis form an angle 7° or larger and 75° or smaller.

8. The method for manufacturing a diffractive optical element according to claim 5, wherein the die is grind-processed by a grindstone or an abrasive.

9. A diffractive optical element manufactured by the method for manufacturing a diffractive optical element according to claim 5.

10. A method for manufacturing a diffractive optical element having an infrared-transmissive ceramic material and prominent portions and groove portions being concentrically formed on a surface of the diffractive optical element the method for manufacturing the diffractive optical element comprising:
preparing a molded body by molding a material powder containing the ceramic material;
heating the molded body to form a sintered precursor; and
preparing a compressed sintered body by compressing while confined by a die, then heating and deforming the sintered precursor the die including corresponding parts that form the prominent portions and the groove portions, a tip of corresponding parts for forming the groove portion of the die being located in a section that includes an optical axis of the sintered precursor having a radius of curvature larger than one-half the average grain size of the material powder, wherein the average value of the surface roughness Ra within an optical effective area of the principle surface is 0.05 μm or less and the difference in the surface roughness Ra of any two areas of the optical effective area of the optical element is 0.02 μm or less.

11. The method for manufacturing a diffractive optical element according to claim 10, wherein a surface on a far side of the optical axis at the tip of the part for forming the groove portion in the section tilts further away from the optical axis as the distance from the tip increases, and the surface and a straight line parallel to the optical axis form an angle 7° or larger and 75° or smaller.

12. The method for manufacturing a diffractive optical element according to claim 10, wherein the die is being grind-processed by a grindstone or an abrasive.

13. A diffractive optical element manufactured by the method for manufacturing a diffractive optical element according to claim 10.

* * * * *